US012596984B2

(12) United States Patent
Zhang et al.

(10) Patent No.: US 12,596,984 B2
(45) Date of Patent: Apr. 7, 2026

(54) INFORMATION GENERATION APPARATUS, INFORMATION GENERATION METHOD AND PROGRAM

(71) Applicant: NTT, Inc., Tokyo (JP)

(72) Inventors: Xiaoxi Zhang, Tokyo (JP); Masahiro Sotoma, Tokyo (JP); Machiko Shinozuka, Tokyo (JP); Midori Kawada, Tokyo (JP); Minako Hara, Tokyo (JP)

(73) Assignee: NTT, Inc., Tokyo (JP)

( * ) Notice: Subject to any disclaimer, the term of this patent is extended or adjusted under 35 U.S.C. 154(b) by 1 day.

(21) Appl. No.: 18/724,770

(22) PCT Filed: Feb. 16, 2022

(86) PCT No.: PCT/JP2022/006259
§ 371 (c)(1),
(2) Date: Jun. 27, 2024

(87) PCT Pub. No.: WO2023/157149
PCT Pub. Date: Aug. 24, 2023

(65) Prior Publication Data
US 2025/0117729 A1 Apr. 10, 2025

(51) Int. Cl.
*G06Q 10/0637* (2023.01)
*G06F 40/205* (2020.01)

(52) U.S. Cl.
CPC ....... *G06Q 10/0637* (2013.01); *G06F 40/205* (2020.01)

(58) Field of Classification Search
None
See application file for complete search history.

(56) References Cited

U.S. PATENT DOCUMENTS

| | | | |
|---|---|---|---|
| 5,907,841 A | 5/1999 | Sumita et al. | |
| 9,529,974 B2 * | 12/2016 | Li | G06Q 50/26 |
| 2005/0283314 A1 * | 12/2005 | Hall | A01B 79/005 702/2 |
| 2006/0212480 A1 * | 9/2006 | Lundberg | G06Q 10/10 |

(Continued)

FOREIGN PATENT DOCUMENTS

| | | | |
|---|---|---|---|
| DE | 112021001101 T5 * | 1/2023 | G11B 27/031 |
| JP | H06-231178 | 8/1994 | |
| JP | 2002-251590 | 9/2002 | |

OTHER PUBLICATIONS

Q. Ran, L. Huang, Y. Wang, C. Zhang and X. Song, "Content analysis of we media marketing," 2016 International Conference on Logistics, Informatics and Service Sciences (LISS), Sydney, NSW, Australia, 2016, pp. 1-7 (Year: 2016).*

(Continued)

*Primary Examiner* — Jerry O'Connor
*Assistant Examiner* — Philip N Warner
(74) *Attorney, Agent, or Firm* — IPUSA, PLLC

(57) ABSTRACT

An information generation apparatus includes a processor; and a memory storing instructions that cause the processor to execute a process. The process includes acquiring information associated with a selected field; extracting a subject matter from the acquired information; and generating time series information relating to the extracted subject matter.

8 Claims, 8 Drawing Sheets

(56)                   References Cited

U.S. PATENT DOCUMENTS

| | | | |
|---|---|---|---|
| 2007/0291737 A1* | 12/2007 | Mohan | H04M 3/5125 |
| | | | 370/352 |
| 2008/0133316 A1* | 6/2008 | Sarkar | G06Q 30/0204 |
| | | | 705/7.33 |
| 2011/0029324 A1* | 2/2011 | Kondo | G16H 10/60 |
| | | | 705/3 |
| 2018/0046926 A1* | 2/2018 | Achin | G06N 5/02 |
| 2019/0034512 A1* | 1/2019 | Baral | G06N 5/02 |
| 2019/0363958 A1* | 11/2019 | Brunets | G06Q 10/107 |
| 2021/0192412 A1* | 6/2021 | Krishnaswamy | |
| | | | G06Q 10/06316 |
| 2021/0209554 A1* | 7/2021 | Hill | G06Q 10/101 |
| 2021/0256084 A1* | 8/2021 | Marsh | G06F 16/9537 |
| 2022/0076343 A1* | 3/2022 | Ward | G06Q 40/06 |
| 2023/0101451 A1* | 3/2023 | Dowing | G06Q 10/06375 |
| | | | 705/7.37 |

OTHER PUBLICATIONS

Masahiro Kakuwa, "Scenario Planning Theory: Its Techniques and Practical Applications", https://oilgas-info.jogmec.go.jp/_res/projects/default_project/_project_/pdf/7/7809/201609_001a.pdf, Sep. 2016.

* cited by examiner

Fig. 7

| RANK | PLAYER | APPEARANCE FREQUENCY |
|------|--------|----------------------|
| (1) | ELECTRIC VEHICLE | 145 TIMES |
| (2) | ENERGY INDUSTRY (OIL) | 130 TIMES |
| (3) | ... | ... |

INFORMATION GENERATION APPARATUS, INFORMATION GENERATION METHOD AND PROGRAM

TECHNICAL FIELD

The present invention relates to an information generation apparatus, an information generation method, and a program.

BACKGROUND ART

In recent years, there have been concerns about various risks such as the spread of infectious diseases on a global level, server attacks, climate change, and resource shortages. Moreover, the international situation has become extremely complex. It is desirable for companies to formulate business strategies after predicting to some extent what society will look like in the near future, but the background described above makes it extremely difficult to accurately predict the future. Among them, a method called scenario planning proposes a method of analyzing the current situation, creating a plurality of future scenarios, and formulating a company's business strategy for each future scenario (NPL 1).

CITATION LIST

Non Patent Literature

NPL 1: Kakuwa, Scenario Planning Theory: Its Techniques and Practical Applications, https://oilgas-info-.jogmec.go.jp/_res/projects/default_project/project/pdf/7/7809/201609_001a.pdf

SUMMARY OF INVENTION

Technical Problem

However, the related art described above requires extensive knowledge and experience of experts, such as structuring events and thinking about future predictions, so there is a problem in that it is difficult for amateurs to analyze information such as practical scenarios.

An object of the disclosed technique is to facilitate analysis of information.

Solution to Problem

The disclosed technique is an information generation apparatus including: an associated information acquisition unit configured to acquire information associated with a selected field; a subject matter extraction unit configured to extract a subject matter from the acquired information; and a time series information generation unit configured to generate time series information relating to the extracted subject matter.

Advantageous Effects of Invention

Analysis of information can be facilitated.

BRIEF DESCRIPTION OF DRAWINGS

FIG. 7 is a diagram illustrating an example of ranking of subject matters according to the present embodiment.

DESCRIPTION OF EMBODIMENTS

An embodiment (present embodiment) of the present invention will be described below with reference to the drawings. The embodiment described below is merely an example, and embodiments to which the present invention is applied are not limited to the following embodiment.

Related Art

First, the related art will be described. In the related art, a method called scenario planning proposes a method of analyzing the current situation, creating a plurality of future scenarios, and formulating a company's business strategy for each future scenario.

Figure 1:
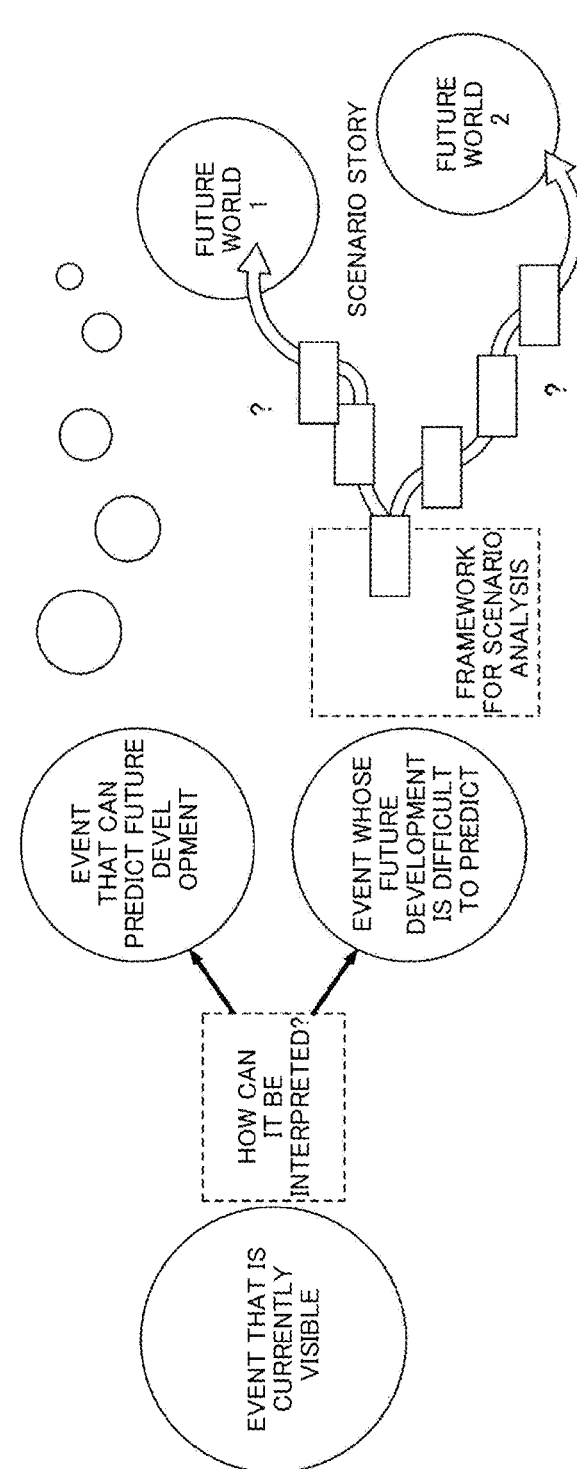
FIG. 1 is a diagram illustrating an example of a scenario planning method in the related art.

FIG. 1 is a diagram illustrating an example of a scenario planning method in the related art (NPL 1). NPL 1 discloses, as a first procedure, a procedure for structuring the current world business and classifying an event that is easy to predict in the future and an event that is difficult to predict in the future. Then, as a second procedure, a procedure for analyzing more deeply an event that is difficult to predict in the future and has a large impact, considering several possibilities, and creating a plurality of scenarios is disclosed. Further, as the final procedure, a procedure for devising a strategy in each scenario is disclosed.

However, the related art requires extensive knowledge and experience of experts, such as structuring events and thinking about future predictions, so there is a problem in that it is difficult for amateurs to generate practical scenarios.

Overview of Present Embodiment

An information generation apparatus according to the present embodiment is a device that extracts a subject matter from associated information such as news and a statistical report on the basis of a selected field, an analysis frame, or the like, and generates time series information in which events for each subject matter are arranged in time series. Time series information may also be called a scenario. The subject matter may also be called a player in the scenario. This enables practical scenario planning even for people who do not have specialized knowledge or experience.

Figure 2:
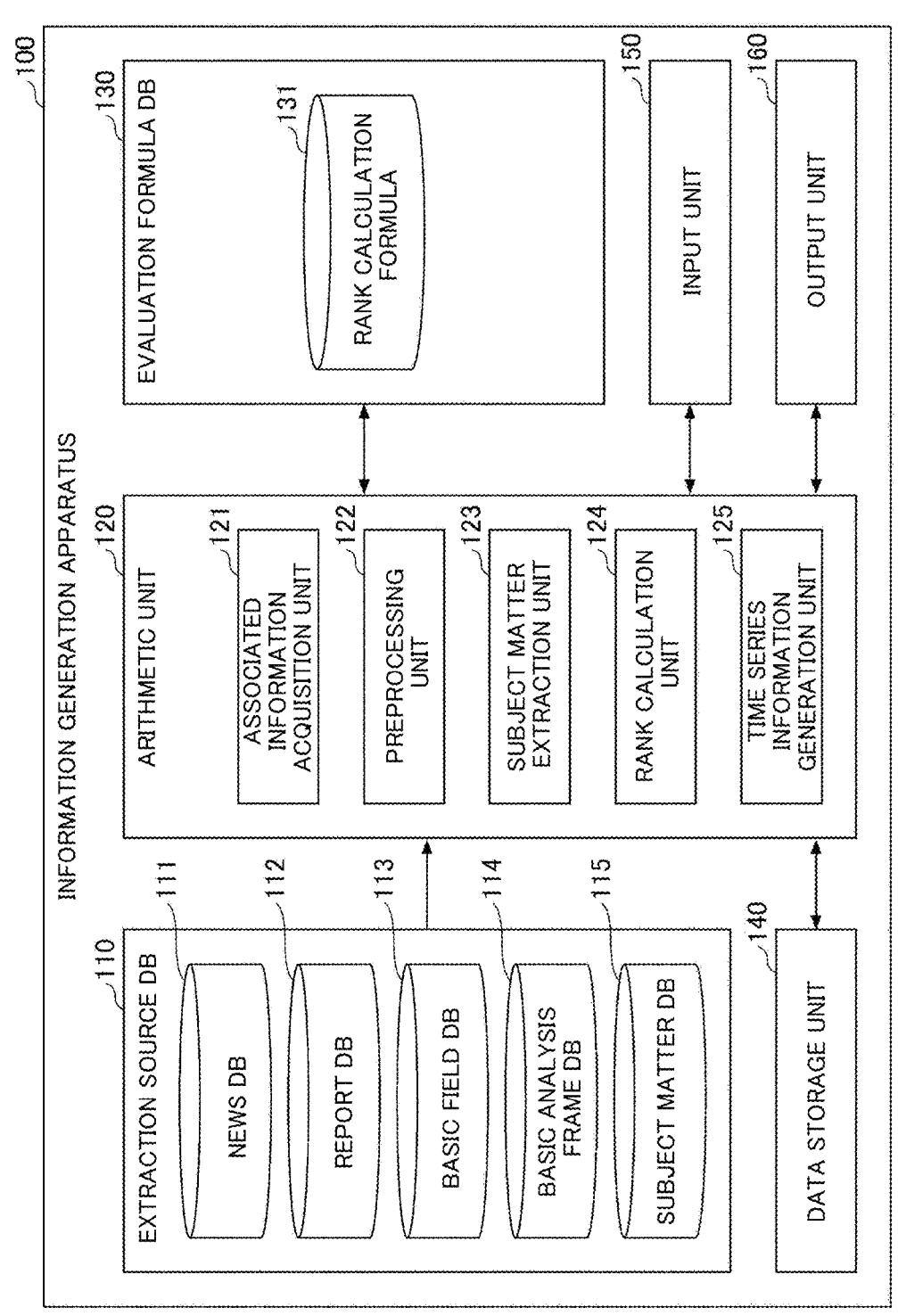
FIG. 2 is a diagram illustrating an example of a functional configuration of an information generation apparatus according to the present embodiment.

Example of Functional Configuration of Information Generation Apparatus According to Present Embodiment FIG. 2 is a diagram illustrating an example of a functional configuration of the information generation apparatus according to the present embodiment. An information generation apparatus 100 includes an extraction source DB 110, an arithmetic unit 120, an evaluation formula DB 130, a data storage unit 140, an input unit 150, and an output unit 160.

The extraction source DB 110 is a database in which information to be extracted is stored. Specifically, the extraction source DB 110 includes a news DB 111, a report DB 112, a basic field DB 113, a basic analysis frame DB 114 and a subject matter DB 115.

The news DB 111 is a database in which text data indicating news articles is stored.

The report DB 112 is a database in which report data such as a statistical report is stored.

The basic field DB 113 is a database in which information indicating a field (basic field) that is a basis of extraction targets is stored. The basic field may be, for example, an "environmental energy field," an "information processing field," and the like.

The basic analysis frame DB 114 stores information indicating a basic framework (basic analysis frame) for analyzing information to be extracted. The basic analysis frame may be, for example, a PEST analysis frame which is often used in a scenario planning method, an analysis frame such as a three-layer structure frame called an SDGS wedding cake, and the like.

The subject matter DB 115 is a database in which information indicating a subject matter to be extracted is stored. The subject matter may be, for example, "electric vehicle," "energy industry (oil)," and the like.

The arithmetic unit 120 performs various types of processing on the extracted information to generate time series information. Specifically, the arithmetic unit 120 includes an associated information acquisition unit 121, a preprocessing unit 122, a subject matter extraction unit 123, a rank calculation unit 124, and a time series information generation unit 125.

The associated information acquisition unit 121 retrieves and extracts associated articles from the news DB 111 and the report DB 112 in accordance with the selected basic field and basic analysis frame. The associated information acquisition unit 121 may acquire daily news articles, industry analysis reports, and the like from other server devices via a communication network (such as the Internet). The associated information acquisition unit 121 stores the acquired information in the data storage unit 140.

The preprocessing unit 122 performs preprocessing on the acquired associated information. For example, the preprocessing unit 122 may reconstruct a sentence included in the associated information. Specifically, the preprocessing unit 122 may divide a long sentence into short sentences or add a subject to a sentence having no subject. The preprocessing unit 122 converts the sentence included in the associated information into a sentence whose meaning can be more accurately read using a machine learning technology or the like.

The subject matter extraction unit 123 extracts a subject matter from the preprocessed associated information. For example, the subject matter extraction unit 123 may extract a subject matter in the evaluation field by natural language processing and display an image in which the extracted subject matter is plotted in the selected basic analysis frame on a screen or the like. The subject matter extraction unit 123 may select words that can be a subject matter from the subject matter DB 114. The subject matter extraction unit 123 may extract a plurality of subject matters, or may extract an index indicating a relationship with the plurality of extracted subject matters, occurrence events, and the like.

When a plurality of subject matters are extracted, the rank calculation unit 124 ranks the subject matters on the basis of an appearance frequency of words indicating the subject matter in the sentence or an index indicating a relationship with other subject matters, occurrence events, and the like. The ranking of the subject matters may reflect the result of receiving the selection of the user. The rank calculation unit 124 may extract a subject matter with a high ranking as a key subject matter on the basis of the ranking result.

The time series information generation unit 125 extracts events (policies, plans, etc.) from the past to the future in time series on the basis of main information relating to a subject matter (or a key subject matter), and generates information collected in time series (time series information). When consistency cannot be achieved (or a divergence occurs), the time series information generation unit 125 may generate time series information collected for each of a plurality of information groups. At this time, each information group may be called a story.

The evaluation formula DB 130 is a database in which information indicating an evaluation formula for evaluating the associated information is stored. For example, the evaluation formula DB 130 stores information indicating a rank calculation formula 131. The rank calculation formula 131 is a calculation formula for ranking a subject matter (or a key subject matter).

The data storage unit 140 stores information such as news and a statistical report acquired by the associated information acquisition unit 121.

The input unit 150 receives an operation input by the user. For example, the input unit 150 receives an operation for selecting a basic field, a basic analysis frame, and the like.

The output unit 160 outputs various types of information. For example, the output unit 160 may display information on a screen or the like, or may transmit information to other devices via a communication network or the like.

Example of Operation of Information Generation Apparatus According to Present Embodiment Next, the operation of the information generation apparatus 100 will be described. The information generation apparatus 100 executes information generation processing according to a user's operation or the like, or periodically.

Figure 3:
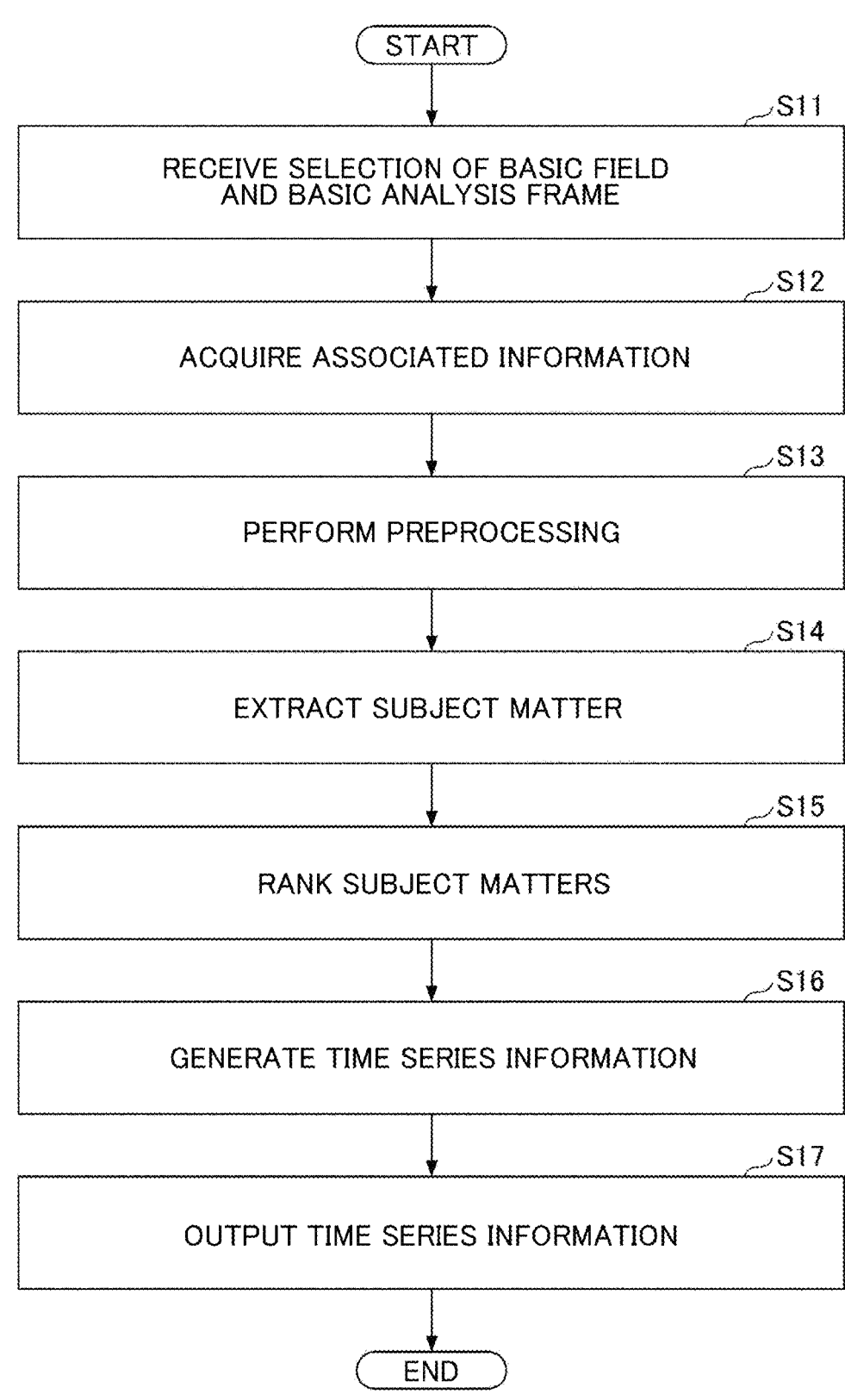
FIG. 3 is a flowchart illustrating an example of a flow of information generation processing according to the present embodiment.

FIG. 3 is a flowchart illustrating an example of a flow of information generation processing according to the present embodiment.

The input unit 150 receives selection of a basic field and a basic analysis frame (step S11). The user selects, for example, a field to be evaluated and an analysis frame to be used from the basic field DB 113 and the basic analysis frame 114.

Next, the associated information acquisition unit 121 acquires associated information by retrieving and extracting associated articles from the news DB 111 and the report DB 112 (step S12). The acquired associated information is stored in the data storage unit 140.

Subsequently, the preprocessing unit 122 performs preprocessing on the acquired associated information (step S13). Next, the subject matter extraction unit 123 extracts a subject matter from the preprocessed associated information (step S14).

When a plurality of subject matters are extracted, the rank calculation unit 124 ranks the subject matters by using the rank calculation formula 131 (step S15). Then, the time series information generation unit 125 generates time series information relating to a subject matter (or a key subject matter) (step S16).

The output unit 160 outputs the generated time series information (step S17). For example, the output unit 160 may display the generated time series information on a screen of the like.

Results of Implementation

Next, an example of the results of a concrete implementation of the information generation apparatus 100 according to the present embodiment will be described. Below, an example will be shown in which time series information indicating the impact on the environmental energy field in the United States due to the change of administration of President XXX of the United States and future scenarios is generated.

In step S11 illustrated in FIG. 3, the input unit 150 received the selection of the "environmental energy field" as a basic field. The input unit 150 also received the selection of the "PEST analysis frame" as a basic analysis frame.

Figure 4:
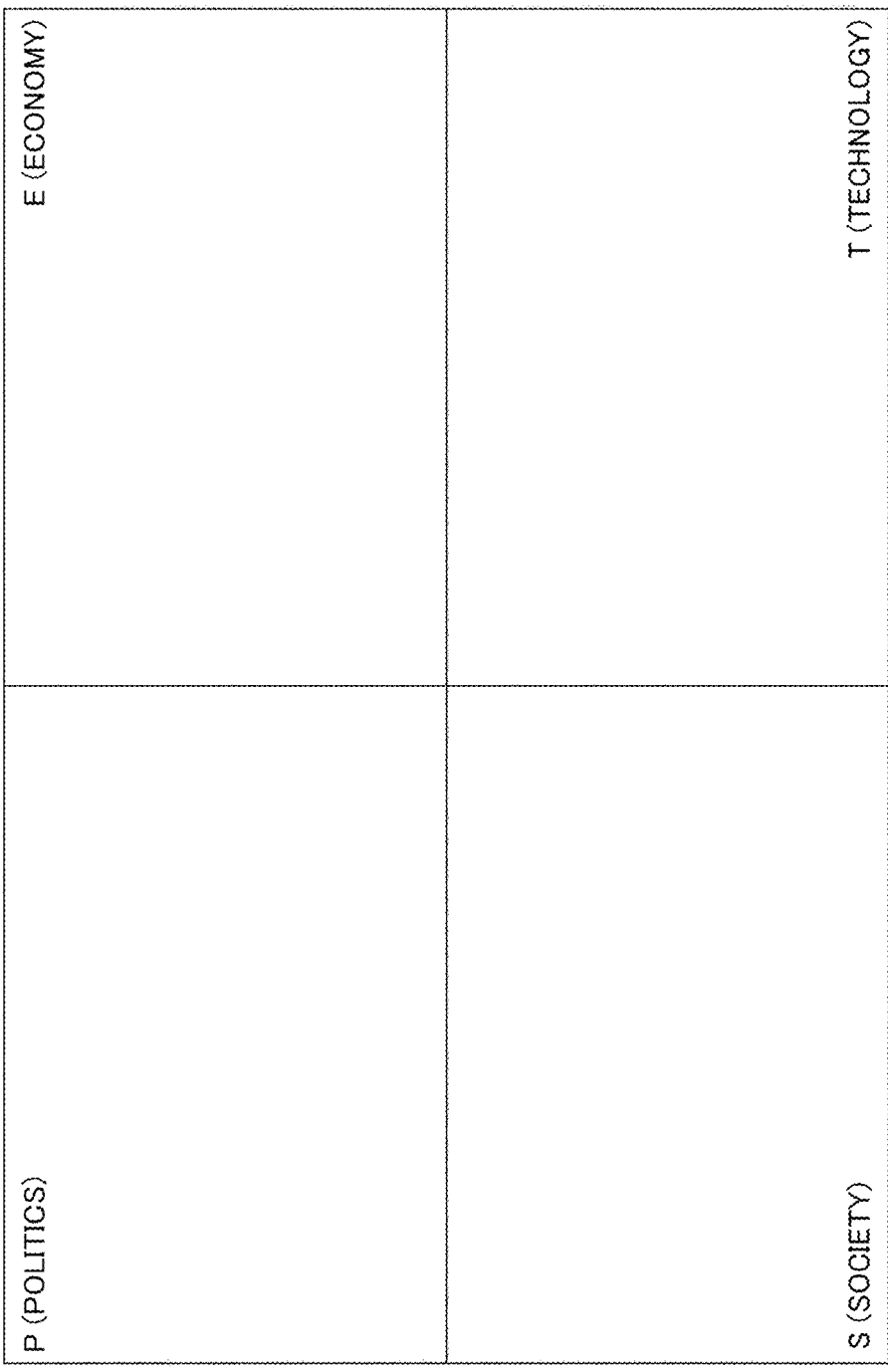
FIG. 4 is a diagram illustrating an example of a basic analysis frame according to the present embodiment.

FIG. 4 is a diagram illustrating an example of a basic analysis frame according to the present embodiment. The basic analysis frame illustrated in FIG. 4 is a PEST analysis frame, and an analysis frame for analyzing the relationship between each piece of information by plotting information on four indices of politics, economy, society, and technology.

Figure 5:
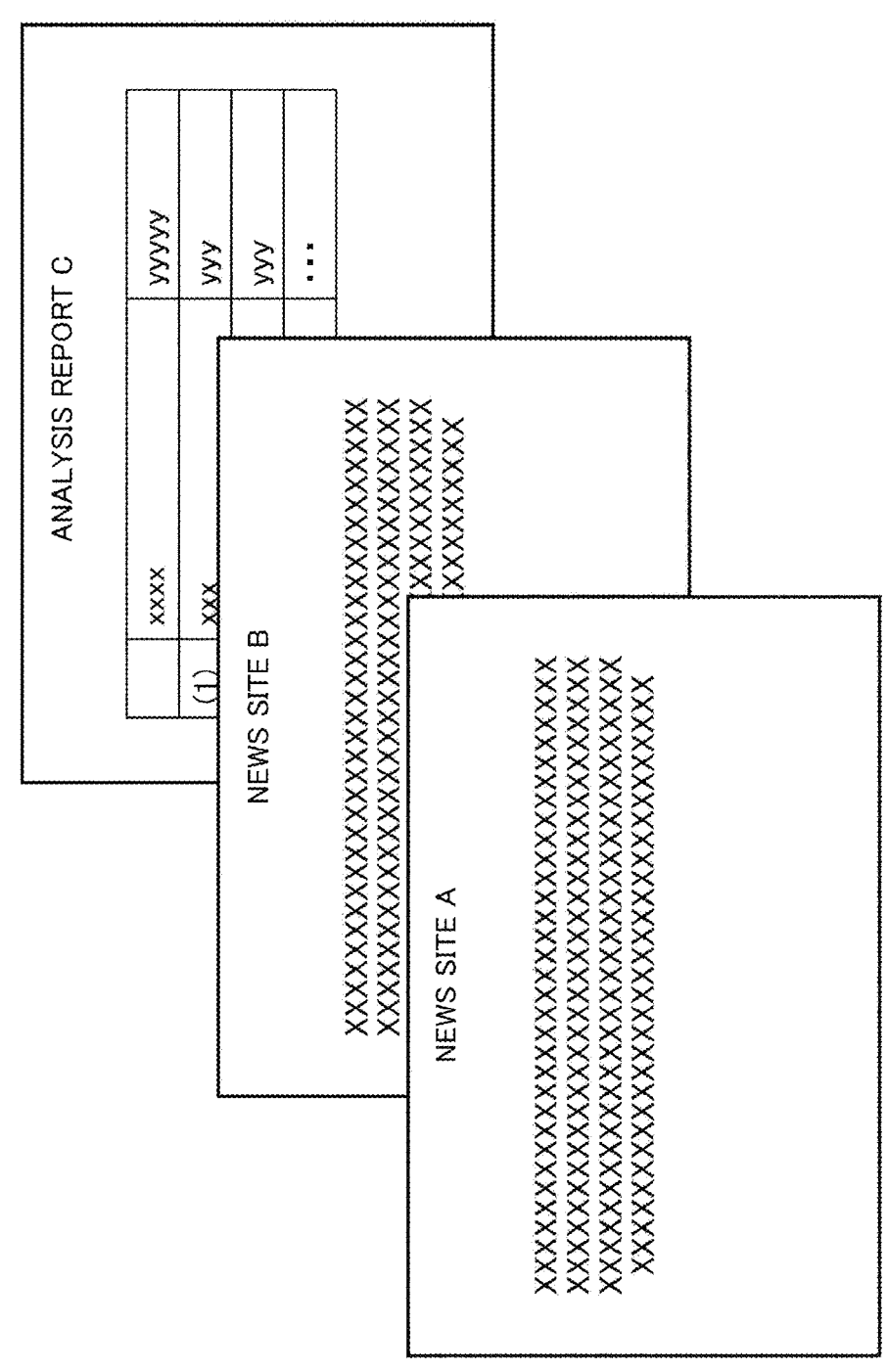
FIG. 5 is a diagram illustrating an example of a source from which associated information is extracted according to the present embodiment.

FIG. 5 is a diagram illustrating an example of a source from which associated information is extracted according to the present embodiment. In step S12 illustrated in FIG. 3, a target to be extracted by the associated information acquisition unit 121 is, for example, an article of a news site published on the Internet or the like, an analysis report, or the like.

Further, in step S13 of information generation processing, the preprocessing unit 122 performed preprocessing on the following original text. The original text is as follows.

"In terms of infrastructure and investment, $2 trillion over four years will be invested in clean energy infrastructure and other areas to rebuild roads, bridges, water systems, power grids, and the like, creating millions of jobs. Additionally, to promote the spread of electric vehicles (EVs), EV charging facilities will be installed at 500,000 locations across the United States. The federal and local governments will procure zero-emission vehicles."

The results of the preprocessing performed by the preprocessing unit 122 on the original text described above are as follows.

"In terms of infrastructure and investment, the federal government will invest $2 trillion over four years in clean energy infrastructure and other areas. The federal government will use this investment to rebuild roads, bridges, water systems, power grids and the like, creating millions of jobs. Additionally, to promote the spread of electric vehicles (EVs), the federal government will invest and EV charging facilities will be installed at 500,000 locations across the United States. The federal and local governments will procure zero-emission vehicles."

Figure 6:
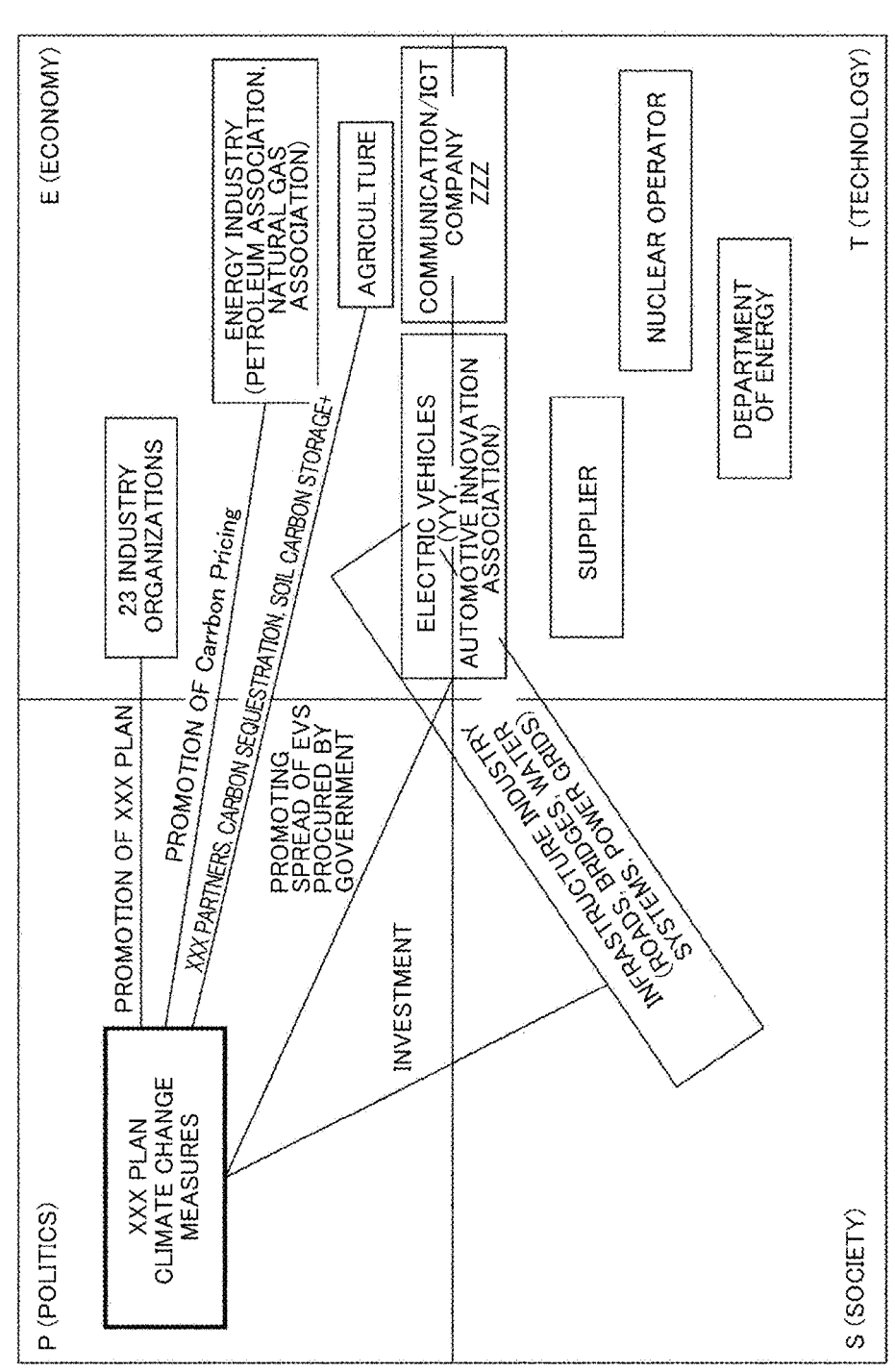
FIG. 6 is a diagram illustrating an example of a subject matter extraction result according to the present embodiment.

FIG. 6 is a diagram illustrating an example of a subject matter extraction result according to the present embodiment. In step S14 of information generation processing, the subject matter extraction unit 123 generated information in which the extracted subject matter is plotted on the basic analysis frame as illustrated in FIG. 6.

FIG. 7 is a diagram illustrating an example of ranking of subject matters according to the present embodiment. In step S15 of information generation processing, the rank calculation unit 124 prioritized the player (subject matter) in the order of (1) electric vehicle, (2) energy industry (oil), etc. on the basis of the appearance frequency of words as subject matters.

Then, in step S16 of information generation processing, the time series information generation unit 125 generates time series information relating to a subject matter with high priority as follows.

The EV spread rate in the United States was 3% in 2018, but 7% in 2019, and 8% in 2020.

By the end of 2025, in US automakers, YYY will invest $27 billion in electric vehicles (EVs) and autonomous technology. ZZZ will also invest $29 billion during the same period.

By 2025, AAA has announced a goal for 40% of new cars sold in the US market to be electric models, including hybrid cars.

By 2025, BBB will install EV charging stations in 500, 000 locations.

By 2030, the Big Three US automakers announced on the 5th that they aim to increase the proportion of electric vehicles (EVs) in new car sales to 40 to 50% by 2030.

By 2035, California will ban the sale of new gasoline-powered vehicles.

The user may separately use a scenario planning method or the like to analyze the impact of the change in the Biden administration on the US environmental energy field, particularly on the electric vehicle industry. With the information generation apparatus 100 according to the present embodiment, analysis becomes easier.

With the information generation apparatus 100 according to the present embodiment, a subject matter from associated information such as news and a statistical report is extracted on the basis of a selected field, an analysis frame, or the like, and time series information in which events for each subject matter are arranged in time series is generated. Therefore, analysis of information can be facilitated.

Example of Hardware Configuration According to Present Embodiment

The information generation apparatus 100 can be implemented, for example, by causing a computer to execute a program describing the processing details described in the present embodiment. Note that this "computer" may be a physical machine or a virtual machine on the cloud. When using a virtual machine, the "hardware" described here is virtual hardware.

The program can be stored and distributed by being recorded in a computer-readable recording medium (portable memory or the like). Furthermore, the program can also be provided through a network such as the Internet or an electronic mail.

Figure 8:
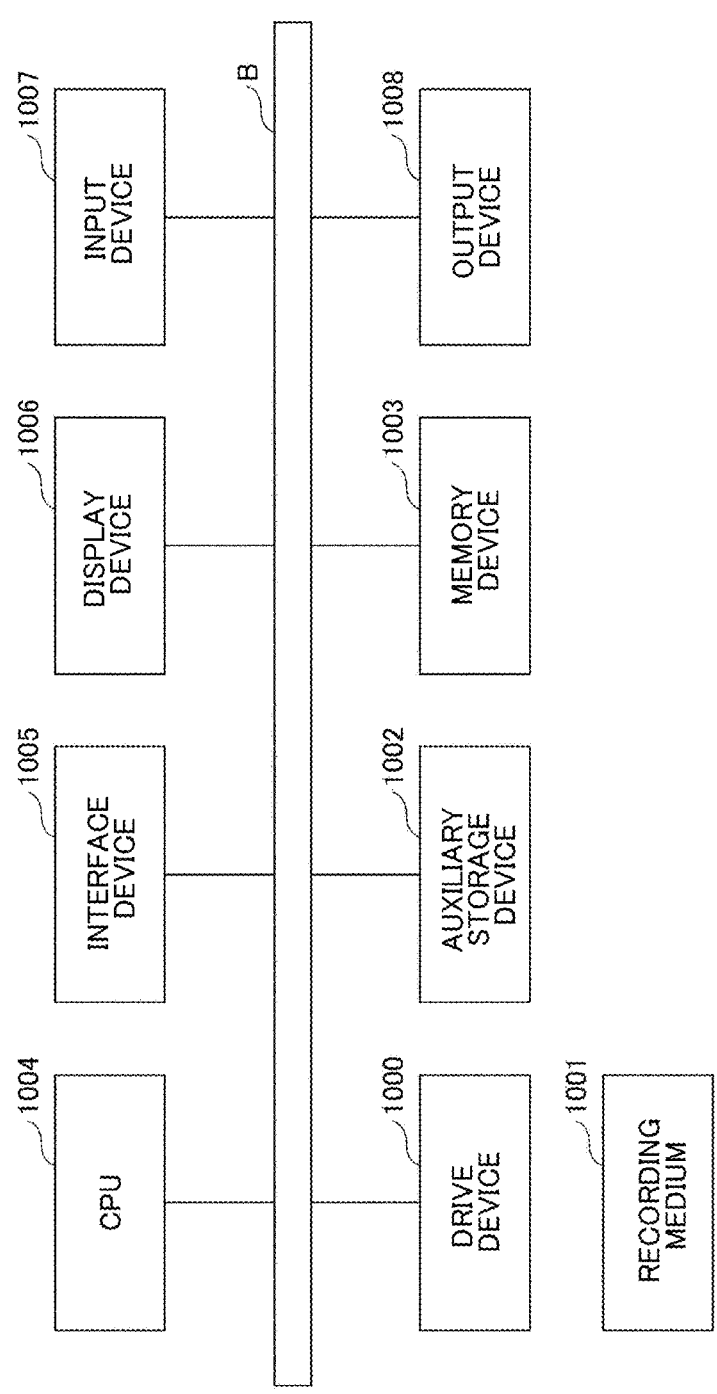
FIG. 8 is a diagram illustrating an example of a hardware configuration of a computer.

FIG. 8 is a diagram illustrating a hardware configuration example of the computer. The computer illustrated in FIG. 4 includes a drive device 1000, an auxiliary storage device 1002, a memory device 1003, a CPU 1004, an interface device 1005, a display device 1006, an input device 1007, an output device 1008, and the like, which are connected to each other via a bus B.

The program for implementing the processing in the computer is provided by, for example, a recording medium 1001 such as a CD-ROM or a memory card. When the recording medium 1001 in which the program is stored is set in the drive device 1000, the program is installed from the recording medium 1001 to the auxiliary storage device 1002 through the drive device 1000. However, the program need not necessarily be installed from the recording medium 1001, and may be downloaded from another computer via a network. The auxiliary storage device 1002 stores the installed program and stores necessary files, data, and the like.

In a case where an activation instruction for the program is given, the memory device 1003 reads out the program from the auxiliary storage device 1002 and stores the program. The CPU 1004 implements a function related to the device in accordance with a program stored in the memory device 1003. The interface device 1005 is used as an interface for connecting to a network. The display device 1006 displays a graphical user interface (GUI) or the like according to the program. The input device 1007 includes a keyboard and mouse, buttons, a touch panel, or the like, and is used to input various operation instructions. The output device 1008 outputs a calculation result. Also, the above computer may include a graphics processing unit (GPU) or a tensor processing unit (TPU) instead of the CPU 1004, or may include a GPU or a TPU in addition to the CPU 1004. In this case, for example, the processing may be divided and executed in such a way that the GPU or TPU executes processing requiring special arithmetic operations, and that the CPU 1004 executes other processing.

Summary of Embodiment

This specification describes at least the information generation apparatus, the information generation method, and the program described in each of the following items.
(Item 1)
An information generation apparatus including:
an associated information acquisition unit configured to acquire information associated with a selected field;
a subject matter extraction unit configured to extract a subject matter from the acquired information; and
a time series information generation unit configured to generate time series information relating to the extracted subject matter.
(Item 2)
The information generation apparatus according to Item 1, further including a rank calculation unit configured to, when a plurality of subject matters are extracted, calculate priority of the plurality of subject matters,
in which the time series information generation unit generates the time series information by prioritizing the subject matter with high priority.
(Item 3)
The information generation apparatus according to Item 1 or 2, further including a preprocessing unit configured to perform preprocessing for converting a sentence of the information acquired by the associated information acquisition unit into a sentence suitable for natural language processing,
in which the subject matter extraction unit extracts a subject matter from the preprocessed information by natural language processing.
(Item 4)
The information generation apparatus according to any one of Items 1 to 3, further including an output unit configured to output an image in which the subject matter extracted by the subject matter extraction unit is plotted on a selected analysis frame.

(Item 5)
An information generation method executed by an information generation apparatus, the method including:
acquiring information associated with a selected field;
extracting a subject matter from the acquired information; and
generating time series information relating to the extracted subject matter.
(Item 6)
A program for causing a computer to function as each unit in the information generation apparatus according to any one of Items 1 to 4.

Any of the above configurations provides a technique that facilitates analysis of information. According to Item 2, it is possible to generate the time series information by prioritizing the subject matter with high priority. According to Item 3, it is possible to improve the accuracy of processing by converting the sentence into a sentence suitable for natural language processing. According to Item 4, it is possible to output an image in which the subject matter is plotted on the analysis frame.

Although the present embodiment has been described above, the present invention is not limited to such a specific embodiment, and various modifications and changes can be made within the scope of the gist of the present invention described in the claims.

REFERENCE SIGNS LIST

100 Information generation apparatus
110 Extraction source DB
120 Arithmetic unit
121 Associated information acquisition unit
122 Preprocessing unit
123 Subject matter extraction unit
124 Rank calculation unit
125 Time series information generation unit
130 Evaluation formula DB
131 Rank calculation formula
140 Data storage unit
150 Input unit
160 Output unit
1000 Drive device
1001 Recording medium
1002 Auxiliary storage device
1003 Memory device
1004 CPU
1005 Interface device
1006 Display device
1007 Input device
1008 Output device

The invention claimed is:
1. An information generation apparatus comprising:
a processor; and
a memory storing instructions that cause the processor to execute a process, the process including
acquiring information associated with a selected field;
extracting a subject matter from the acquired information; and
generating time series information relating to the extracted subject matter,
wherein the generating time series information includes:
extracting, for each of the extracted plurality of subject matters, events relating to the subject matter based on information concerning the subject matter from past to future, and generating information in which the extracted events are summarized in chronological order, wherein the generating time series information further includes:

arranging the extracted subject matters within a basic analysis frame stored in a basic analysis frame DB, the basic analysis frame including at least one of a PEST analysis frame and an SDGs wedding cake frame, and generating scenario information in which events associated with the subject matters are ordered along a time axis based on the positions of the subject matters in the basic analysis frame, and grouping the information items and generating a plurality of scenarios while maintaining temporal consistency within each group upon determining that inconsistency occurs among information items;

wherein the process further includes outputting an image in which the plurality of subject matters extracted by the subject matter extraction unit are plotted on the selected analysis frame.

2. The information generation apparatus according to claim 1, wherein the process further comprises calculating, when a plurality of subject matters are extracted, priority of the plurality of subject matters, wherein the generating includes generating the time series information by prioritizing the subject matter with high priority.

3. The information generation apparatus according to claim 1, wherein the process further comprises performing preprocessing for converting a sentence of the acquired information into a sentence suitable for natural language processing, wherein the extracting includes extracting a subject matter from the preprocessed information by natural language processing.

4. The information generation apparatus according to claim 1, wherein the process further comprises outputting an image in which the extracted subject matter is plotted on a selected analysis frame.

5. The information generation apparatus according to claim 1, wherein the outputting includes, when a user selects one of the plurality of subject matters plotted on the selected basic analysis frame, displaying detailed information and time series information related to the selected subject matter, and changing a display to show scenario information corresponding to the selected subject matter.

6. The information generation apparatus according to claim 1, wherein the time series information generation unit is configured to, when inconsistency occurs among information items, adjust an order of events so that consistency of events in time series within each information group is maintained.

7. An information generation method executed by an information generation apparatus, the information generation method comprising:

acquiring information associated with a selected field;

extracting a subject matter from the acquired information; and generating time series information relating to the extracted subject matter, wherein the generating time series information includes:

extracting, for each of the extracted plurality of subject matters, events relating to the subject matter based on information concerning the subject matter from past to future, and generating information in which the extracted events are summarized in chronological order, wherein the generating time series information further includes:

arranging the extracted subject matters within a basic analysis frame stored in a basic analysis frame DB, the basic analysis frame including at least one of a PEST analysis frame and an SDGs wedding cake frame, and generating scenario information in which events associated with the subject matters are ordered along a time axis based on the positions of the subject matters in the basic analysis frame, and grouping the information items and generating a plurality of scenarios while maintaining temporal consistency within each group upon determining that inconsistency occurs among information items;

wherein the information generation method further includes outputting an image in which the plurality of subject matters extracted by the subject matter extraction unit are plotted on the selected analysis frame.

8. A non-transitory computer-readable recording medium having computer-readable instructions stored thereon, which when executed, cause a computer to perform the information generation method according to claim 7.

* * * * *